United States Patent [19]

Weber

[11] 4,300,650
[45] Nov. 17, 1981

[54] MULTILEVEL POWER ASSISTED STEERING

[76] Inventor: Harold J. Weber, 20 Whitney Dr., Sherborn, Mass. 01770

[21] Appl. No.: 102,429

[22] Filed: Dec. 10, 1979

[51] Int. Cl.$^3$ .............................................. B62D 5/08
[52] U.S. Cl. ................................... 180/142; 180/143
[58] Field of Search ................ 180/142, 143, 141, 132

[56] References Cited

U.S. PATENT DOCUMENTS

| | | | |
|---|---|---|---|
| 2,356,492 | 8/1944 | Smith | 180/142 |
| 2,748,881 | 6/1956 | Holley | 180/141 |
| 2,791,287 | 5/1957 | Stolte | 180/143 |
| 3,693,747 | 9/1972 | Nishikawa | 180/143 |
| 3,924,705 | 12/1975 | Sugisawa | 180/143 |
| 4,071,109 | 1/1978 | Ezoe | 180/143 |

FOREIGN PATENT DOCUMENTS 52-41325  3/1977  Japan ..................... 180/143

Primary Examiner—John A. Pekar

[57] ABSTRACT

A multilevel power assisted steering system for vehicular application providing more than one value of steering assist to the operator thereof, the purpose for which is intended to provide better operating safety and economy. A first, or greater, value of operator assist is provided for low speed maneuvering situations, or when steering a nearly stationary vehicle such as when parking. A second, or lesser, value of assist is provided as the vehicle speed rate is purposefully increased by the operator thereby coacting to overcome at least in part any reduction in vehicle handling performance which may be brought about by such power steering assistance. In particular, the intent is to enhance the "road feel" vital to the secure handling of motor vehicles, in particular automobiles, at the higher road speeds.

7 Claims, 5 Drawing Figures

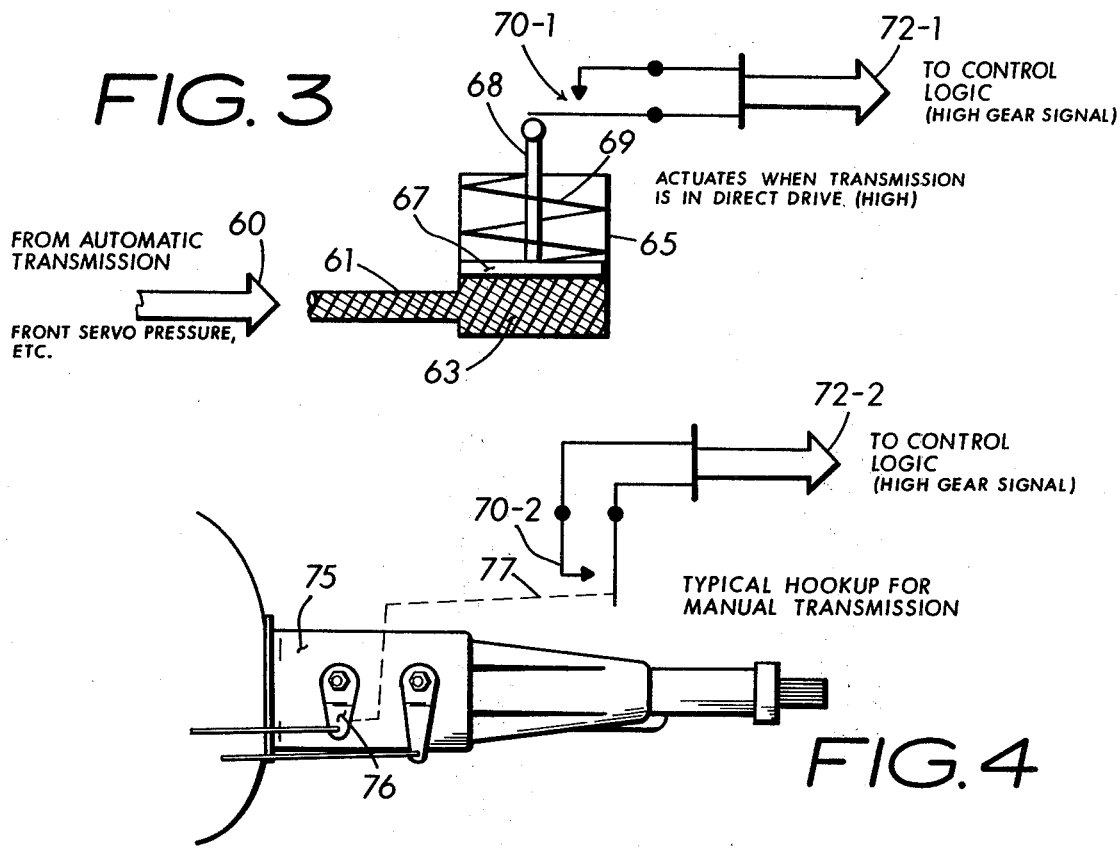
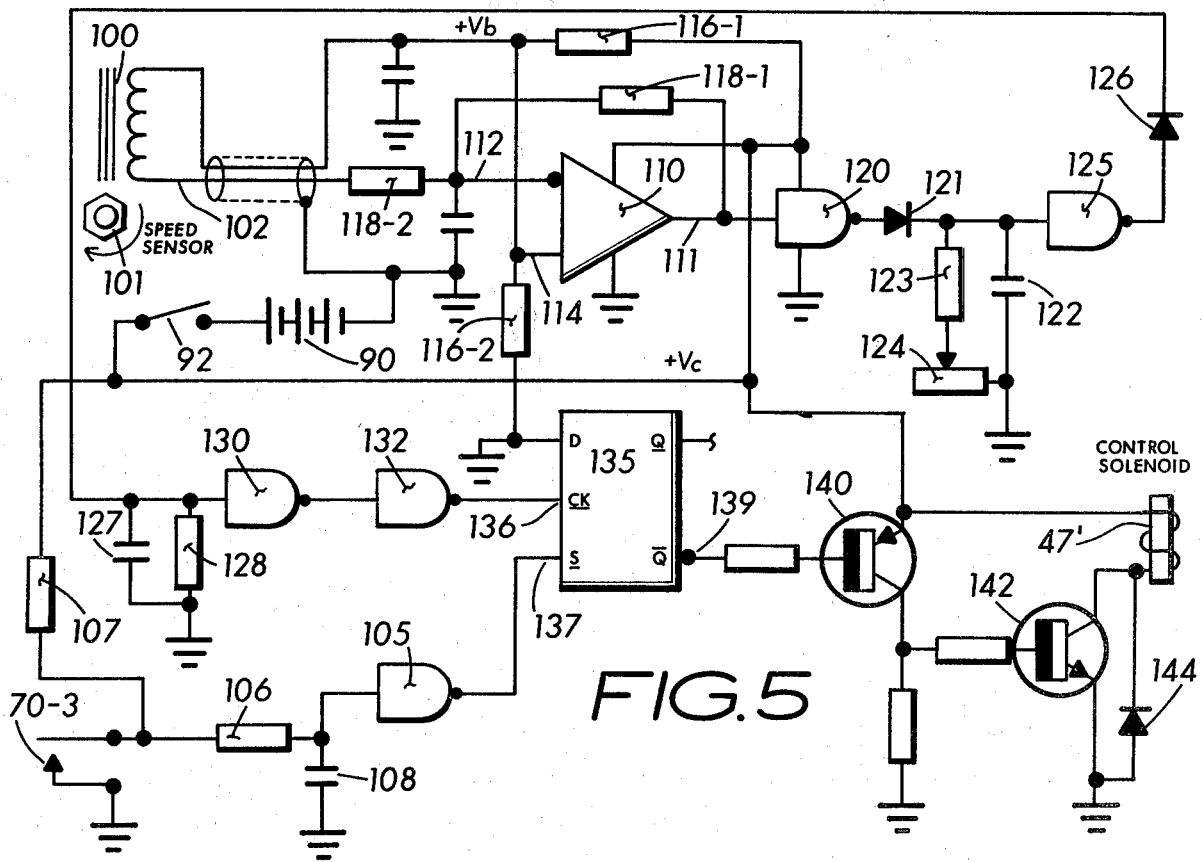

MULTILEVEL POWER ASSISTED STEERING

SUMMARY OF THE INVENTION

With the advent of more compact, lighter weight passenger vehicles being widely favored in view of the need to economize on fuel consumption, the role of power assisted steering for such vehicles becomes the subject for increased concern regarding safety and economy. This concern is based upon the different handling characteristics found to be typical of small automobiles. With power steering the intrinsic ease of steering of a relatively stationary vehicle, such as encountered in a parking situation, is certainly enhanced: especially for a less muscular or aged person. On the other hand, light weight vehicles do have a tendency for poor handling characteristics, such as over-steering, wandering, and the like at highway speeds, e.g. speeds above about forty miles per hour when equipped with ordinary power steering assist. Aside from the vehicle's lighter weight, which is usually well below 3,000 pounds, such handling characteristics are further accentuated by the smaller tire sizes, more rigid suspension, and shorter wheelbase typical of such modern vehicles. Aside from the obvious mechanical steerability difficulties which may arise, the sense of driver insecurity brought about by decreased road response, i.e. road "feel", can also lead to a decrease in overall vehicle safety due to tension induced fatigue, nervousness, and other factors affecting the operator's overall driving behavior.

It is therefore the intent of my instant invention to provide a power assisted steering apparatus which will provide a first level of maximum assist for low speed driving situations, such as vehicle parking and the like.

It is yet another intent to provide a power assisted steering apparatus having a second level of reduced assist for high speed, typically open road driving.

Still another purpose for the invention is to provide a smooth transistion from the greater first level of assist to the lesser second level of assist, and vice versa.

Yet another aspect of my teaching is to provide reduced energy consumption by the vehicle at higher speeds when power assisted steering is least needed through reduced power steering system pressures and pump work load requirement.

These and other aspects of my instant invention's improvement will become apparent as the description unfolds.

BRIEF DESCRIPTION OF THE DRAWINGS

One sheet of drawing including five figures serves to depict the nature of my invention.

FIG. 3 Control signal switch for coupling with automatic shift transmission.

FIG. 4 Control signal switch for coupling with manual shift transmission.

FIG. 5 Electrical diagram for a control logic embodiment including the essence of my invention.

DETAILED DESCRIPTION OF THE DRAWINGS

Figure 1:
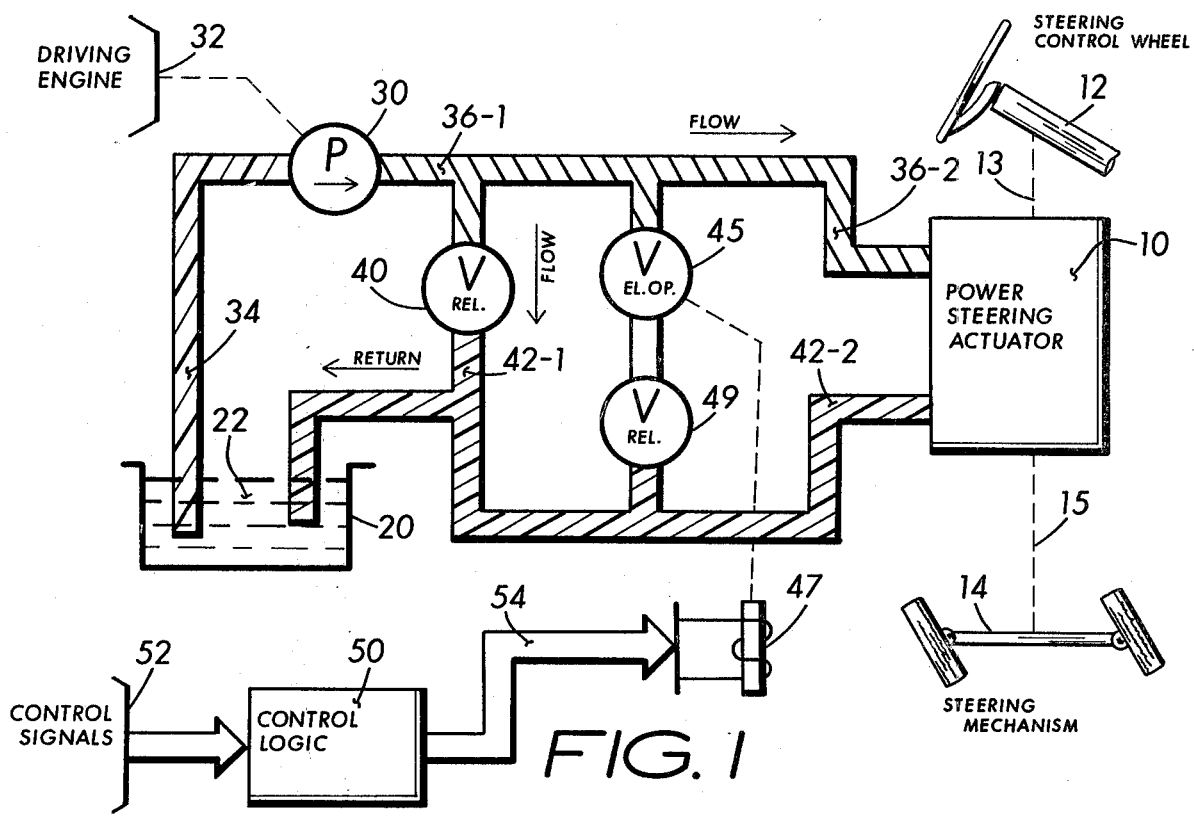
FIG. 1 Diagram for improved power steering system operating with first level of assist.

A schematic view of the typical power assisted steering arrangement, including the essence of my invention, appears in FIG. 1. Such a system is typical and is widely used with automobiles, trucks, tractors, and other wheeled motor vehicles. A power steering servo actuator 10 of conventional design is shown having a mechanical control input coupled 13 to a steering wheel means 12 which is usually controlled by the driver or operator. The actuator also couples 15 to the steering mechanism 14 controlling the vehicle's direction determining wheels or the like. Such an actuator system is well known; reference is made to "Chilton's Auto Repair Manual", published by Chilton Book Company, New York, Library of Congress Catalog Card No. 54-17274 pages 1190 through 1225 for detailed discussion of this old art. A reservoir 20 confines a quantity of hydraulic fluid 22. A pressure PUMP 30, which is coupled as by a belt of the like to a driving engine 32, serves to pickup some of the fluid 22 by way of a pickup tube 34. The pump action delivers fluid 36-1 under a value of first pressure usually on the order of at least 1,000 pounds per square inch (p.s.i.) to a RELIEF VALVE 40. The valve's main purpose is to relieve the pressure at the set p.s.i. point, bypassing at least some of the pressurized fluid 42-1 back to the return tube 42. This relief and bypass function acts as a first regulator which serves to regulate the hydraulic p.s.i. operating parameters with some of the flow coupled 36-2 to the actuator 10 pressure input for the servo control function. The actuator pressure return output 42-2 routes back through the return pipe 42 to the reservoir 20. VALVE 45 is depicted as CLOSED in FIG. 1. Therefore no fluid flow reaches RELIEF VALVE, or flow control device, 49. Valves 45 and 49 form the very essence of my invention: the improvement over prior art. Valve 45 is electrically operated by a SOLENOID 47. A CONTROL LOGIC circuit accepts certain essential vehicle status control signals 52 which produce an output control signal 54 for the solenoid.

Figure 2:
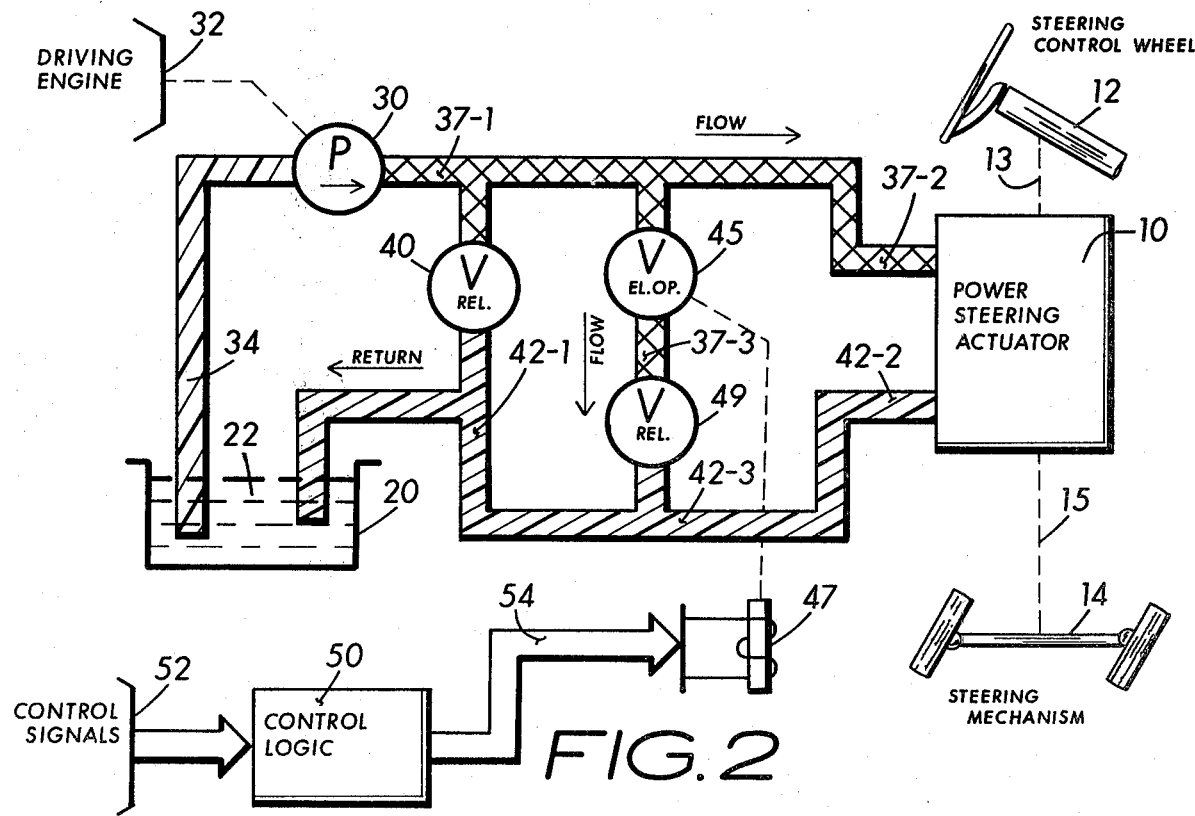
FIG. 2 Diagram for improved power steering system operating with second level of assist.

FIG. 2 shows what occurs when my invention coacts with the power system hydraulic loop. Certain essential CONTROL SIGNALS 52 arrive which command the CONTROL LOGIC 50 to produce an output 54 which enables the solenoid 47 to OPEN the electrically actuated VALVE 45. The result is that the pump output pressure flow 37-3 will pass through valve 45 to RELIEF VALVE 49. Valve 49 is operative to relieve the hydraulic pressure flow 37-1 from the pump at a LOWER p.s.i. value than that of valve 40. This second regulator action shunts or bypasses some of the fluid around the actuator, reducing the effectiveness of the pump pressure on the actuator control action. This is seen as a materially reduced hydraulic pressure flow 37-2 to the actuator 10. The result is the actuator produced steering assist will be appreciably reduced.

The advantages of power assisted steering are usually least beneficial in the vehicle's highest driving gear, which is about representative of the vehicle's highest running speed. Therefore a means appears in FIG. 3 which acts to produce an essential control signal 52 for the control logic function 50 which is unique for "high" gear. The adaptation is with an automatic transmission of conventional design, whereby the input 60 is provided as a hydraulic pressure from the front servo pressure line (in the case of Chrysler and American Motors type of automatic transmission, for example) or other such pressure response point which may be of singularly different value for direct drive than that which exists in other transmission modes. The line pressure 61 fills 63 a cylinder-like receptacle 65 under a piston or diaphragm actuator 67 which includes a pushrod 68 and a compression spring 69. The pushrod serves to actuate a switch contact 70-1 when the line pressure is sufficient to overcome actuator 67 resistance as may be brought about by spring action 69. Thereby a control signal 72-1 is produced.

Yet another control signal provision is shown in FIG. 4, as particularly adaptable to manual or "standard shift" transmissions of conventional design. The typical manual transmission 75 is known to usually have at least two control arms, one of which serves to select at least the highest driving gear. The highest gear selection arm 76 couples 77 to the switch 70-2 which is arranged to actuate when the control arm is in "high" to produce a control signal 72-2.

The control logic function which serves to combine the essential control signals into control solenoid 47 drive levels may be satisfied in any of several ways which, for a good part, is dependent upon the particular requirements of the vehicle and the fabrication capabilities of the manufacturer. FIG. 5 depicts one useful embodiment for the control logic function and is described in substantial detail so as to teach the application of my invention as interactively coupled with the kinds of control signals which may be reasonably expected to be available in the usual motor vehicle. Two principle control signals are used:

vehicle speed rate ("road speed"); and, gear selection mode ("high" or "direct drive"). The "vehicle speed" control signal is developed by the circuit which includes a magnetic pickup 100 which responds to the field variations produced by a cam 101 coupled to the vehicle "speedometer" coupling or other such mechanical motion which relates to the vehicle's road speed such as the drive shaft, etc. The pickup acts to produce an alternating current voltage signal 102 which couples through resistor 118-2 to the inverting input 112 of an amplifier 110, such as an R.C.A. type CA-3140 operational amplifier integrated circuit. Resistors 116-1, 116-2 establish a voltage divider between the $+V_c$ and ground connections which biases $V_b$ the amplifier non-inverting input 114 and the "return" lead to the sensor 100 by a value:

$$V_b = \left( \frac{R116\text{-}2}{R116\text{-}1 + R116\text{-}2} \right) V_c$$

and it is usual for R116-1=R116-2 so $V_b=0.5\ V_c$. The amplifier 110 operates in conjunction with gain setting feedback resistor 118-1 to produce a large signal on output line 111 which reflects the speed sensor signal. This signal couples to a C-MOS type inverter 120, such as an R.C.A. type CD-4049B or the like, which acts to shape or "square up" the speed signal. The positive output transistions from inverter 120 act to couple through steering diode 121 to charge the capacitor 122. The charge will serve to turn-on the inverter 125 input, resulting in a logic LOW on the output of inverter 125. Capacitor 122 discharges exponentially by way of resistors 123, 124 when the output of inverter 120 goes to a logic LOW level. The RC time constant of capacitor 122 and resistors 123 plus 124 is predetermined to be of such value that, when the speed rate signal is great enough, the discharge of the capacitor 122 will not be sufficient to turn OFF the input of inverter 125. This is to say that, when the speed is above the selected threshold rate, the output of inverter 125 will remain LOW, while when the speed is below the selected threshold rate, the output of the inverter 125 will effectively follow the speed rate signal "S" pulses. The approximate time constant value "$t_1$" for the RC components is about:

$$t_1 = \frac{1}{S} \approx 2(R123 + R124)(C122)$$

with the exact threshold value being determined by the variable setting of rheostat resistor 124. At speeds below the threshold value $S_{min}$, the HIGH or positive transitions on the output of inverter 125 couple through steering diode 126 and serve to charge capacitor 127 which is also acted upon by resistor 128 to slowly discharge the capacitor when the inverter 125 output is LOW. The time constant $t_2$ of the combination is selected to be somewhat longer than the speed pulses produced for the vehicle's slowest useful speed in the highest gear. In practice a value on the order of:

$$t_2 = 5\left(\frac{1}{S}\right) \approx 2(R128)(C127)$$

is useful. The result is that when the vehicle speed pulse rate is somewhat less than $S_{min}$, the output of the inverter 130 will be LOW and the input to the CK input of "D type" flip-flop 135 will be HIGH. When the speed is greater than $S_{min}$, the CLOCK input CK to the flip-flop 135 will be LOW. The flip-flop is a positive edge triggered device, such as a C-MOS type CD-4013B or the like. As such it will be realized that the flip-flop clocks only on positive edge transistions which correspond with descending vehicle speed. The gear selection control signal is produced, as described in FIG. 3 or FIG. 4 for example, by a switch 70-3 together with pull-up resistor 107 which CLOSES for HIGH gear, thereby producing a LOW logic level on the input of inverter 105 by way of debouncing elements 106, 108. The result is a HIGH logic level on the SET input S of the flip-flop 135 which accordingly produces a LOW output 139 coupled to the base of PNP transistor 140, turning ON the transistor which acts to pull-up the base of NPN transistor 142, thereby also turning ON the NPN transistor so as to draw current through, and activate, the control solenoid 47' which operates valve 45 to reduce the power steering assist for the vehicle. When the operator "shifts down" so as to open switch 70-3, no immediate change will occur until the rate of the speed pulses produced to represent the vehicle speed are reduced below the speed threshold value $S_{min}$ whereupon a positive transistion will occur on the flip-flop CLOCK input, transferring the ground or LOW value on the "D" input to the Q output: the result is a HIGH value on the complementary Q output 139 which acts to turn off the control solenoid 47'. Such vehicle speed related function adds a safety factor to inhibit undesirable steering response in certain high speed manuvering situations, such as when "shifting down" to overtake another vehicle or to maintain better control on a tight curve. The vehicle battery 90 is shown to typically provide $+V_c$ power through a switch 92 which may be the vehicle's ignition switch or the like.

The very essence of the invention is enhanced by the shift and vehicle speed synchronized transistion between the assist levels. The operator is most prepared for such a change in driving characteristic when a gear shift is involved, thereby reducing the "surprise" or uncertainity effect on the operator's driving habits.

The selection of several different effective values of second pressure is anticipated, the result of which is to provide more than one level variation in the power steering assist. Such a change may be graduated in pressure value, thereby assist level, for each of several different vehicle driving conditions. The detail implementation is obvious to a person skilled in the art and may include a plural arrangement of actuator valve means and a plural arrangement of second regulating means effectively coupled between the pump and the reservoir.

While the particular embodiment as described is suggested to operate with a hydraulic fluid, another pressurizable substance, such as pneumatics or the like, is considered an obvious extension of the teaching.

The multilevel power assisted steering is anticipated to cover any category of vehicle which may find advantage from the teaching. This includes: automobiles, trucks, tractors, off-road motor vehicles, farm machinery, construction machinery, and the like. This further includes military and industrial vehicles. This continues to include other types of vehicles where some advantage may be brought forth, as for example flying machines, and other vessels.

The embodiment brought forth in this teaching includes improvement to the particular kind of hydraulic power assisted steering implemented in large quantity by the leading American motor vehicle manufacturers, including at least General Motors Corp., Ford Motor Corp., Chrysler Corp., and American Motors Corp.

The embodiment brought forth in this teaching includes improvement to the particular kind of hydraulic power assisted steering implemented in large quantity by the leading foreign, non-American motor vehicle manufacturers, including at least Toyota, Datsun, Mercedes-Benz, Volkswagen, Britis-Leyland, Fiat, and Renault as a partial listing.

The essence of the invention, that is the actuator valve and second regulating means, is anticipated to be facilitated as an integral part of the power steering system on a new vehicle design.

The essence of the invention, that is the actuator valve and second regulating means, is anticipated to be manufactured as a separate combination which may be intercoupled with the usual elements of an existing power steering system.

The very essence of this invention is to provide a decreased power steering assist at highway speeds, whilst retaining the full advantage of power assist at low speeds or when manuvering in a nearly stationary situation, such as parking.

While an electrical actuator valve is described, one skilled in the art may be expected to attain about the same essential operation through utilization of the hydraulic pressure built up in the automatic transmission or other power train element to act upon a slave valve element, usually by way of metering valves and other hydraulic logic elements, whereby such slave valve serves as the excitation for the actuator valve means.

What I claim is:

1. Multilevel power assisted steering system adapted for a vehicle which acts to provide the full mechanical advantage of such power assisted steering at low vehicle speed rates or when manuvering such vehicle in a nearly stationary situation, whilst decreasing the said power steering assist when the vehicle attains a greater speed rate value; comprising:
   a. said vehicle having an engine and a steering means;
   b. a pressure pump means provided with at least a pressure output, a suction input, and including a mechanical drive effectively coupled to said engine;
   c. a servo actuator coupled effectively with said steering means and having an operator control, such as a steering wheel, coupled to a mechanical control input thereof, having a pressure input coupled to the pressure pump means output, and further having a pressure return output;
   d. a reservoir means coupled essentially between the pressure pump means suction input and said servo actuator pressure return output and operative therewith to provide a supply of pressurizable substance;
   e. a first regulating means effectively coupled between the pressure pump means pressure output and said reservoir means and operative to produce a value of first pressure as separately coupled to the pressure input of the said actuator;

said improvement provided by:
   f. a second regulating means effectively coupled in parallel with the first regulating means, including an actuator valve coupled effectively in series with said second regulating means and upstream therefrom which serves to selectively enable and disable the said second regulating means effect, that being to produce a lower value of second pressure which supplants the said value of first pressure, as separately coupled to the pressure input of the said actuator; and,
   g. control means having a receptible input for a certain plurality of vehicle status control signals, means for producing said status control signals including at least a signal representative of transmission gearing ratio selection, said control means producing an output signal which couples at least with the said actuator valve means and operates therewith for:
      initially disabling the second regulating means whenever the gearing selection is in a less than about the highest speed transmission gear combination and the vehicle is effectively accelerating;
      effectively enabling the second regulating means whenever the gearing selection changes into about the highest speed transmission gear combination;
      re-disabling the second regulating means whenever the gearing selection reverts into a lower speed transmission gear combination.

2. System of claim 1 whereby said actuator valve means is effectively electrically energized, as by an electromagnetic means.

3. System of claim 1 wherein the improvement found in the combination of the second regulating means and the control means is integrally incorporated into the usual original combination of power assisted steering system elements including at least the pressure pump means, the servo actuator, the reservoir means, and the first regulating means.

4. System of claim 1 wherein the combination of the second regulating means and the control means may be adapted as an improvement to a prior combination of the essential elements of a coactive power steering system including at least the pressure pump means, the servo actuator, the reservoir means, and the first regulating means to provide improvement thereof.

5. System of claim 1 wherein further a slave valve receives hydraulic pressure derived from another separate element of the vehicle's power train and coacts therewith to produce a status control signal which couples with the said control means to provide excitation for the said actuator valve means.

6. System of claim 1 wherein the second regulating means produces an assist level change which occurs nearly coincident with the change of a status control signal produced by a change of an essential vehicle gearing ratio combination.

7. System of claim 1 wherein the second regulating means produces an assist level change which occurs after a change of a status control signal produced by a change of an essential vehicle gearing ratio combination and when said means for producing said status signals produces another status control signal when the vehicle speed rate reaches a predeterminate decrementing value.

* * * * *